United States Patent
Parthasarathy

(12) 
(10) Patent No.: US 6,926,917 B2
(45) Date of Patent: *Aug. 9, 2005

(54) DRY PET FOOD WITH INCREASED PALATABILITY AND METHOD OF PRODUCTION

(75) Inventor: Mukund Parthasarathy, Wildwood, MO (US)

(73) Assignee: Nestec Ltd., Vevey (CH)

(*) Notice: Subject to any disclaimer, the term of this patent is extended or adjusted under 35 U.S.C. 154(b) by 216 days.

This patent is subject to a terminal disclaimer.

(21) Appl. No.: 10/271,878

(22) Filed: Oct. 16, 2002

(65) Prior Publication Data

US 2004/0076718 A1 Apr. 22, 2004

(51) Int. Cl.⁷ ................................................. A23K 1/00
(52) U.S. Cl. ............................. 426/56; 426/18; 426/53; 426/656; 426/805; 426/658
(58) Field of Search ........................... 426/18, 56, 656, 426/658, 805, 53

(56) References Cited

U.S. PATENT DOCUMENTS

| | | | |
|---|---|---|---|
| 3,119,691 A | * 1/1964 | Ludington et al. | 426/99 |
| 3,202,514 A | 8/1965 | Burgess et al. | 99/2 |
| 3,595,666 A | 7/1971 | Dunning et al. | 99/10 |
| 3,617,300 A | 11/1971 | Borochoff et al. | 99/9 |
| 3,653,908 A | 4/1972 | Buck et al. | 99/2 |
| 3,745,023 A | 7/1973 | Greenberg et al. | 99/40 |
| 3,857,968 A | 12/1974 | Haas et al. | 426/33 |
| 3,950,543 A | 4/1976 | Buffa et al. | 426/18 |
| 4,013,775 A | 3/1977 | Nelson et al. | 426/285 |
| 4,190,679 A | 2/1980 | Coffee et al. | 426/623 |
| 4,267,195 A | 5/1981 | Boudreau et al. | 426/2 |
| 4,282,254 A | 8/1981 | Franzen et al. | 426/2 |
| 4,391,829 A | * 7/1983 | Spradlin et al. | 426/28 |
| 4,393,085 A | 7/1983 | Spradlin et al. | 426/28 |
| 4,418,086 A | * 11/1983 | Marino et al. | 426/302 |
| 4,540,585 A | 9/1985 | Priegnitz | 426/28 |
| 4,713,250 A | 12/1987 | Tonyes et al. | 426/2 |
| 4,810,506 A | 3/1989 | Lewis et al. | 426/28 |
| 4,857,339 A | * 8/1989 | Maselli et al. | 426/28 |
| 5,631,032 A | 5/1997 | Gil et al. | 426/28 |
| 5,972,668 A | 10/1999 | Georg et al. | 435/188 |

FOREIGN PATENT DOCUMENTS

| | | |
|---|---|---|
| DE | 43 06 514 A1 | 9/1994 |
| EP | 252 730 | 1/1988 |
| GB | 2 111 366 A | 7/1983 |

* cited by examiner

*Primary Examiner*—C. Sayala
(74) *Attorney, Agent, or Firm*—Bell, Boyd & Lloyd LLC

(57) ABSTRACT

An increased palatability dry pet food product is provided having residual α-amylase activity, a moisture content of 5 to 12%, and an Instron value of between 9.5 and 17.5 foot lbs. A method of producing the dry pet food product is also provided.

9 Claims, 1 Drawing Sheet

DRY PET FOOD WITH INCREASED PALATABILITY AND METHOD OF PRODUCTION

TECHNICAL FIELD

The present invention relates generally to pet food products and, specifically, to a dry pet food with increased palatability and other features, and a method for economically producing the same.

BACKGROUND OF INVENTION

Pet food products are generally divided into three categories: dry, semi-moist, and canned. Although there are no industry standards, dry pet foods typically have a moisture content of less than 15% and generally have a dry, crunchy texture. Semi-moist foods typically have a moisture content in the range of 15 to 50%. Canned foods generally have a moisture content above 50%, and often around 70%. The development and production of various pet food products in these three categories is well known in the art. Food products such as cat and dog food have been known for years, and those skilled in the art are aware of multiple formulations and processes for preparing such products. There remain, however, continuing problems within the art.

Over the years, various techniques have been utilized in attempts to improve the palatability of pet foods. U.S. Pat. No. 3,857,968 discloses a process for improving the palatability of animal foods, such as dog foods, through the enzymatic treatment of a mixture of fat and protein. The patent does not identify the reason for the improvement in palatability. It is disclosed, however, that the reaction produces a complex array of reaction products, which may be responsible for the improvement.

Amino acids are thought to have widely varying aromas and flavors depending upon their type and concentration. There is nothing known in the art to indicate the inherent attractiveness of certain amino acids to dogs. Thus, while U.S. Pat. No. 4,267,195 discloses that L-proline, L-cysteine, L-histidine, and L-lysine are taste active in dogs, there is an apparent need to balance the level of amino acids depending upon the particular composition of the dog food. A more general reference to the flavorful effect of amino acids is made in U.S. Pat. No. 3,653,908, which discloses an intermediate-moisture animal food especially formulated for cats.

U.S. Pat. No. 4,282,254 discloses other amino acids to increase the palatability of dog food.

U.S. Pat. No. 3,745,023 teaches that a specially treated fat preparation may improve palatability when applied to pet foods. A high concentration of free fatty acids may promote palatability.

It is also thought that various sugars may improve the palatability of dog foods. For example, U.S. Pat. No. 3,617,300 to Borochoff et al. indicates that dextrose may improve the palatability of dog foods. According to the disclosed process, some of the starch content of a solid dog food is enzymatically converted to glucose directly in the dog food by α-amylase and amyloglucosidase. This patent teaches that the combination of these two enzymes permits the reaction to occur without adversely affecting the solid character of the dog food.

U.S. Pat. No. 4,393,085 teaches that the palatability of dog food may be improved when at least a potion of the farinaceous ingredients are subjected an amylase enzyme digestion, and protease enzyme digestion and proteinaceous ingredients and a protease are added to the enzymatically modified farinaceous material to form a reaction slurry mixture. The resulting combined reaction slurry mixture can be incorporated into the dog food by coating it on the surface or admixing it with the other dog food ingredients. α-Amylase is also used in the production of maltodextrins as disclosed in U.S. Pat. No. 3,849,194.

While it is recognized that many features contribute to the taste of pet food, it is also recognized that the texture or relative softness of a pet food is also important. Softness is a particular problem with dry dog foods because dry, hard pet foods are sometimes not well accepted by the animal. U.S. Pat. No. 4,540,585 discloses that α-amylase can be added to semi-moist pet foods to improve the softness. To Applicant's knowledge, it is unknown to add α-amylase to a dry pet food to improve palatability and make the food softer. Humectants have also been tried in an effort to maintain a soft texture in pet foods, i.e. U.S. Pat. No. 3,202,514.

SUMMARY OF INVENTION

The present invention concerns dry pet food having improved palatability and a soft texture, and a process for the production of such food. In addition, this process is more economical and allows for higher throughput than some prior art techniques.

In the present invention, an aqueous solution of α-amylase is contacted with the farinaceous ingredients. During processing, the enzyme breaks down the starches into simple sugars, which may enhance flavor or may react with proteins to create reaction flavors which are acceptable to pets. The ingredients are contacted with water and/or steam in a preconditioner. The α-amylase may be contacted with the farinaceous ingredients in the preconditioner or prior to the preconditioner. After preconditioning, the ingredients are then extruded and formed into particles. In the present invention, the extruder has a wet production rate that is higher than some prior art production rates for similar pet foods that are not reacted with α-amylase. The ingredients are extruded at a lower moisture content than prior art pet foods, while at least maintaining normal bulk density. The low moisture content due to decreased process moisture in the preconditioner correlates with the increased palatability of the cat food. The extruded particles are dried and may be coated with flavorings and/or fat. The cause of increased palatability is probably due to an enhanced Mailard reaction. The finished product, which is classified as a dry pet food, has a moisture content of between from about 5% to 12%, and preferably from about 5% to about 8% by weight for cat food and from about 9% to about 12% by weight for dog food. Texture profile analysis conducted using the Instron method shows a marginal softening effect on product treated with enzyme. The energy required to break the kibbles of the pet foods produced in accordance with the teachings of the present invention ranged from about 10.27 foot pounds to about 17.34 foot pounds. The α-amylase treated cat food required 16% less energy to break the kibble. The average energy required to break the prior art cat food kibble was 12.34 foot pounds, whereas the average energy required to break the cat food kibble produced in accordance with the present invention was 10.27 foot pounds. The α-amylase treated dog food required 6.27% less energy to break the kibble. The average energy required to break prior art dog food kibble was 18.5 foot pounds, whereas the average energy required to break the dog food kibble produced in accordance with the present invention was 17.34 foot pounds. This dry pet food is more palatable to animals and softer than some prior art dry pet foods having similar ingredients. The cost for the α-amylase on a per ton basis is relatively inexpensive when compared with some prior art attempts to enhance the palatability and texture of dry pet foods. Throughput is also enhanced using this process.

DETAILED DESCRIPTION

Figure 1:
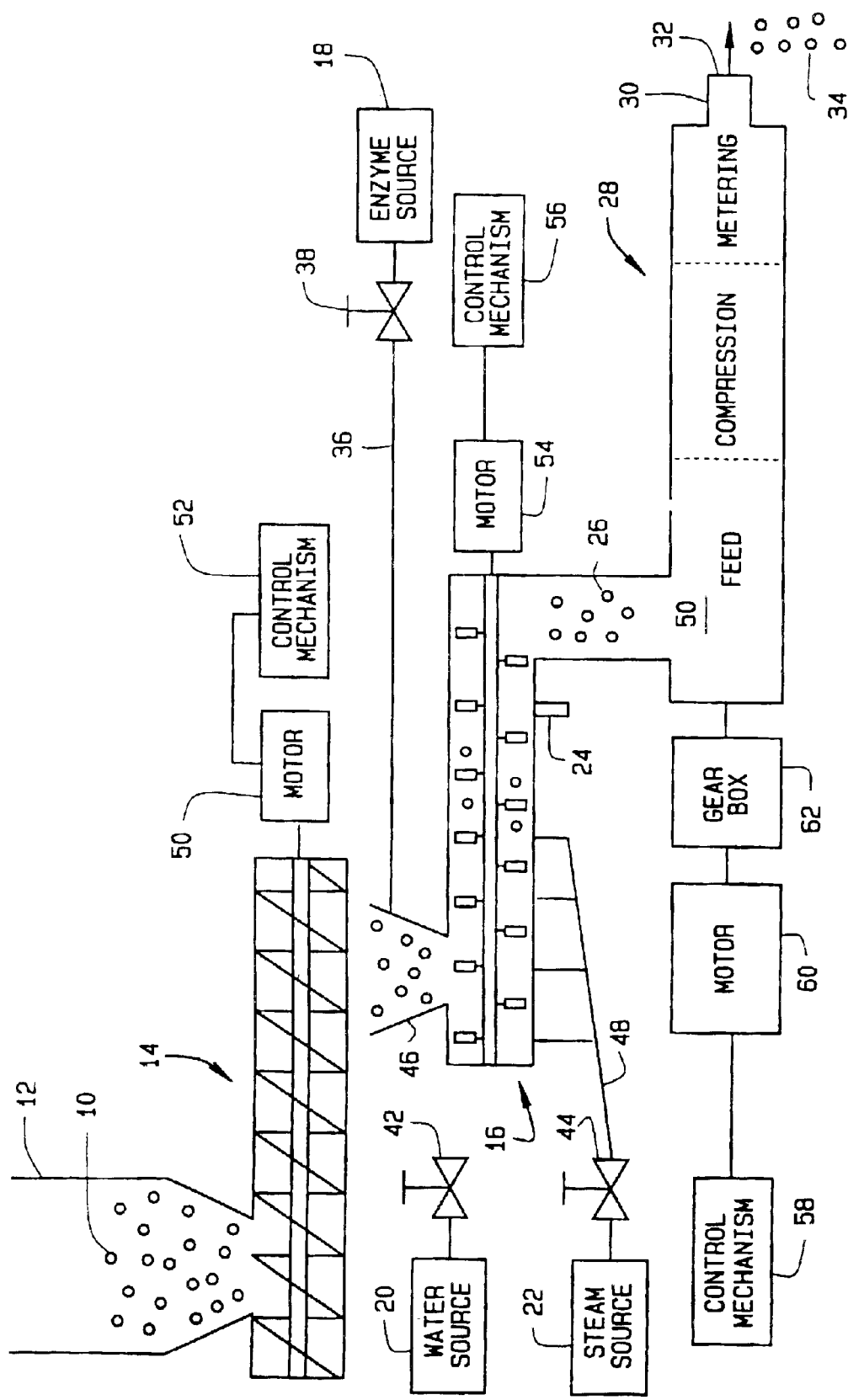
FIG. 1 is a schematic of the preconditioner and extruder used to produce the pet food of this invention.

An improved palatability pet food product having a maintained or improved softness is produced by addition of an effective amount of α-amylase to the pet food product.

α-Amylase is a well-known enzyme. It has an IUBMB number of 3.2.1.1. The enzyme catalyzes the endohydrolysis of 1,4,-α-D-glucosidic linkages in polysaccharides containing three of more 1,4-α-linked D-glucose units. α-Amylase can be derived from fungal, cereal, or bacterial sources. Fungal α-amylase is temperature sensitive, generally becoming deactivated at approximately 60–65° C. (140–149° F.). Certain bacterial amylases have higher thermal stability and can withstand temperatures of up to 110° C. (230° F.). The addition of amylase to starches breaks the starches down into less complex substances (simple sugars) such as maltose, glucose, and low molecular weight dextrins. Use of a heat-stable amylase allows for residual enzyme activity in the food product after production, and thus provides increased softness and shelf-life for the product.

The amount of α-amylase suitable for use in the present invention may vary depending on the precise ingredients used for a particular pet food product, or the precise process used to product the pet food product. Generally, a range of approximately 60 to 600 KNU (1140 to 11400 SKB units) of enzyme is added for each kilogram of product being produced. Units of enzyme herein are given in both KNU, the measure of activity used by the manufacturer of the α-amylase used in the present examples, and SKB units, which are an older measure of amylase activity known in the art and set forth in Sanstedt, et al., Cereal Chemistry, Vol. 16, page 712 (1939). Factors that influence the amount of enzyme used in practicing the present invention may include the moisture content of the food product, the activity of the enzyme, calcium levels, chloride levels, the pH of the product, the temperature of the product, the amount of starch in the product, and the time available to the enzymatic reaction given various process parameters. Each of these parameters can influence the rate and degree of enzymatic activity. Most pet food products contain sufficient calcium and chloride to activate the enzyme. If suitable amounts of these ions are not present in the pet food product, they may be added in the form of suitable edible salts.

The precise reaction conditions and process parameters used for producing a pet food product in accordance with the teachings of the present invention may vary depending on the type of pet food product being produced and the specific α-amylase being used. As the temperatures involved in the production process may vary depending on the type of pet food product being produced, an α-amylase that is stable within process parameters should be selected.

As with temperature, the pH of the product may vary according to the specific pet food product being produced. An α-amylase should be selected that reacts effectively at pH levels encountered during the process.

It is important to note that the starch in the pet food product must be gelatinized before α-amylase is able to act on it. Thus, the pet food product must be subjected to a sufficient temperature, and for a sufficient time, to gelatinize the starch. The temperature and time must not be so great, however, as to inactivate the α-amylase. To that end, a heat-stable α-amylase is preferable to one that cannot withstand high temperatures.

A preferred α-amylase for the purposes of the present invention is a bacterial α-amylase (1,4-α-D-glucanohydrolase) produced from *Bacillus stearothermophilus*, which can be obtained from Novozymes of Franklinton, N.C., under the brand name Termamyl® 120L, Type S. This particular α-amylase is active at temperatures of up to 105–110° C. Another α-amylase that is suitable for use in this invention is produced from *Bacillus licheniformis* and can also be obtained from Novozymes of Franklinton, N.C. under the brand name Termamyl® 120L, Type L.

Referring now to FIG. 1, a schematic illustration of the process for producing the dry pet food product of the present invention is shown. Dry ingredients 10, including at least one amylaceous ingredient and generally composed of farinaceous ingredients, proteinaceous ingredients and dry vitamins and minerals and the like, are delivered from a bin 12 or other suitable device and are mixed in a suitable mixing device 14. Suitable farinaceous ingredients are wheat, corn, barley, oats, and the like, generally in dry meal forms. Also suitable is ground corn, whole-wheat flour, brewers rice, or other grains and cereals. The dry proteinaceous ingredients are generally obtained from meat or vegetable sources. Suitable ingredients include corn gluten meal, poultry by-product meal, soybean meal, fish meal, animal digest, and calcium choline chloride. Dry vitamin ingredients can include vitamins E, A, B-12, D-3, riboflavin, niacin, calcium pantothenate, biotin, thiamine mononitrate, folate, pyridoxine hydrochloride, menadione sodium bisulfate complex (a source of vitamin K), and others. Minerals may include potassium chloride, calcium carbonate, calcium chloride, dicalcium phosphate, sodium chloride, zinc sulfate, ferrous sulfate, manganese sulfate, copper sulfate, calcium iodate, and sodium selenite, among others. It is to be understood that the dry ingredients enumerated above do not constitute an exhaustive list. Any suitable combination of dry ingredients may be used, and such dry ingredients may vary depending on the type of animal for which the food is being produced.

Just prior or subsequent to the introduction of dry ingredients 10 into a preconditioner 16, a heat stable α-amylase is delivered from an enzyme source 18 and is contacted with dry ingredients 10. The enzyme is preferably added at a rate of 0.05 to 0.5% by weight of dry meal per hour, and the addition of enzyme is controlled by valve 38, which allows flow of the enzyme solution along line 40. Any thermal-stable α-amylase capable of withstanding the temperatures of the present process may be used, but a preferred α-amylase is the Termamyl® 120L, Type L and Type S, product described above. This α-amylase is stable at operating temperatures of 105 to 110° C. and has an activity, as sold, of 120 KNU/g ($2.28 \times 10^3$ SKB units/g). The enzyme is sold in aqueous solution and is contacted, in liquid form, with the dry ingredients of the present invention. The enzyme is preferably added to a concentration of 0.12 to 0.30 KNU (2.28 SKB units) per gram of dry meal.

Inside preconditioner 16, water 20 and/or stream 22 is added to produce a semi-moist wet mix 26. The addition of water 20 and/or steam 22 is controlled by valves 42 and 44, respectively, which allow for the flow of water 20 and steam 22 along lines 46 and 48, respectively. Wet mix 26 preferably has a moisture content of from about 22% to about 28% and typically in the preferred amount of about 24.6% or lower as determined by a moisture sensor 24 inside of preconditioner 16. Wet mix 26 is retained within preconditioner 16 for approximately 5 seconds, and no longer than 20 seconds, which is sufficient to moisten and begin cooking the mixture which will achieve a temperature of about 93.3° C. (200° F.) upon exit from preconditioner 16.

Wet mix 26 then moves into an extruder 28 wherein it is cooked for a sufficient time and at a sufficient temperature to cook the food product while leaving at least some of the α-amylase active. The minimum retention time inside extruder 28 is approximately 30 to 60 seconds, and preferably no more than 300 seconds. The temperature inside extruder 28 is generally in the range of 93 to 110° C. The extrudate is cut into particles 34 called 'kibbles' by passing it through a die cap 30 and cutting it with a spinning knife 32. The extruder has a wet production rate of 6000 to 7300 pounds per hour for cat food and 5600 pounds per hour for dog food. The particles exiting the extruder have a moisture content in the range of from about 18% to about 28%, preferably from about 18% to about 23% by weight for cat food and from about 25% to about 28% for dog food. While not attempting to express any theory, it has been found that the low moisture content at this stage in the process, relative to the prior art, correlates with the increased palatability of the cat food.

After extrusion, the particles 34 are transferred to a dryer (not shown), wherein they are dried to a final moisture content of from about 5% to about 12%, preferably from about 5% to about 8% for the cat food product and from about 9% to about 12% for the dog food product. The drying temperature is preferably in the range of 71 to 148° C. (160–300° F.). The retention time in the dryer is generally approximately 20 to 30 minutes, and preferably no longer than 180 minutes. By the end of the drying step, when the product is ready for packaging, at least some of the α-amylase enzyme is still active and the product has a bulk density in the range of 18 to 22 pounds per cubic foot (27 to 32 pounds per bushel) for cat foods and 20 to 30 pounds per cubic foot (31 to 45 pounds per bushel) for dog foods. The moisture content of the finished product is from about 5% to about 12%, preferably from about 5% to about 8% by weight for cat food and from about 9% to about 12% by weight for dog food, and even more preferably from about 5% to about 7% by weight for cat food.

Each of the above devices, such as mixing device 14, preconditioner 16 and extruder 28, are powered by motors and under the control of control systems that are well known in the art. Mixing device 14 is powered by motor 50 and under the control of control mechanism 52. Preconditioner 16 is powered by motor 54 and under the control of control mechanism 56, and extruder 28 is powered by motor 60 and under the control of control mechanism 58. Control of extruder 28 is also regulated by gear box 62.

EXAMPLES

The following examples are presented for the purpose of further illustrating and explaining the present invention. The examples are not intended to in any way limit the scope of the present invention.

Examples 1 and 2 describe the preparation of similar dry cat food products, with the difference being that example 1 describes a prior art cat food product not prepared by the addition of α-amylase in accordance with the present invention, and example 2 describes a cat food product prepared in accordance with the teachings of the present invention.

Example 1

Prior Art Cat Food

A dry cat food is produced in accordance with a prior art technique using the following formula:

| Ingredient | Amount by Weight |
| --- | --- |
| Farinaceous components | 44% |
| Proteinaceous components | 46% |
| Fat | 7% |
| Flavorings | 2% |
| Vitamins, minerals and essential fatty acids | 1% |

The dry farinaceous components, dry proteinaceous components, dry vitamins, minerals and essential fatty acids were fed into a 16-inch preconditioner at approximately 4,000 pounds/hour. This flow rate is sometimes referred to as the "dry meal feed rate."

The preconditioner used in the present example was a 16" diameter wet mixer or preconditioner having a length of approximately 9 feet. Water and/or steam was added in the preconditioner to raise the moisture content to approximately 20% by weight of the other components (this is sometimes referred to as the "condensed meal moisture"). The temperature of the meal in the preconditioner was about 93° C. (200° F.). The meal retention time in the preconditioner was about 5 seconds.

Next, the preconditioned meal moved into an extruder having a diameter of about 7 inches and a length of about 10 feet with a 200 plus horsepower motor. The motor driving the extruder uses 483 volts, 3 phase, AC current and can draw up to about 200 amps. The throughput of the extruder is about 5,000 pounds per hour, which is sometimes referred to as the "wet production rate." The meal retention time in the extruder was approximately 45 seconds. The inside extruder temperature and the temperature of the extrudate was approximately 110° C. (230° F.). The cooling jacket water temperature was approximately 60° C. (140° F.). After passing through a die cap, the extrudate was cut into particles (sometimes called kibbles) with a splitting/cutting knife.

The particles were then transferred to a dryer having a temperature of 148° C. (300° F.). The retention time in the dryer for the particles was approximately 30 minutes.

Next, the dry cat food was coated with tallow and acid flavorings. The finished product had a moisture content of approximately 7.5% by weight. The finished product had an Instron local peak force value of approximately 12.34 foot lbs. and was relatively crunchy. The shelf life of the dry cat food produced in this example was approximately 18 months. The caloric content (metabolizable energy) of the dry cat food produced in this example was approximately 1760 Kcal/lb.

The chemical analysis of this finished dry cat food is approximately as follows:

| Ingredient | Amount by Weight |
| --- | --- |
| Crude Protein | 31.5–34.5% |
| Crude Fat | 11.0–14.5% |

-continued

| Ingredient | Amount by Weight |
|---|---|
| Crude Fiber | 4.5% |
| Moisture | 12% |
| Linoleic acid | 1.25% |
| Arachidonic acid | 0.02% |
| Calcium | 1.1% |
| Phosphorous | 0.9% |
| Taurine | 0.125% |

Example 2
Dry Cat Food Produced in Accordance with the Present Invention

A dry cat food is produced in accordance with the present invention using the following formula:

| Ingredient | Amount by Weight |
|---|---|
| Farinaceous components | 44% |
| Proteinaceous components | 46% |
| Fat | 7% |
| Flavorings | 2% |
| Vitamins, minerals and essential fatty acids | 1% |

The dry farinaceous components, dry proteinaceous components, dry vitamins, minerals and essential fatty acids were fed into a 16-inch preconditioner at a dry meal feed rate of approximately 6200 pounds/hour. Inside the preconditioner, an aqueous solution containing α-amylase was contacted with the dry ingredients. The α-amylase used was Termamyl® 120L, Type S, obtained from Novozymes, Franklinton, N.C. The enzyme is sold with an activity of 120 KNU/g ($2.28 \times 10^3$ SKB units/g), however a 1:10 dilution was performed prior to contacting the enzyme solution with the dry ingredients. The application rate of the enzyme solution was 0.25% of the weight of the dry ingredients per hour.

The preconditioner used in the present example was a 16" diameter wet mixer or preconditioner, having a length of approximately 9 feet. Water and/or steam was added in the preconditioner to a condensed meal moisture of approximately 20% by weight of the other components. The temperature of the meal in the preconditioner was about 93° C. (200° F.). The meal retention time in the preconditioner was about 5 seconds.

Next, the preconditioned meal moved into an extruder having a diameter of about 7 inches and a length of about 10 feet with a 200 plus horsepower motor. The motor driving the extruder uses 483 volts, 3 phase, AC current and can draw up to about 200 amps. The wet production rate of the extruder was about 7300 pounds per hour. The meal retention time in the extruder was approximately 30 seconds. The inside extruder temperature and the temperature of the extrudate was approximately 110° C. (220° F.). The cooling jacket water temperature was approximately 60° C. (140° F.). After passing through a die cap, the extrudate was cut into particles (sometimes called kibbles) with a splitting/cutting knife.

The particles were then transferred to a dryer having a temperature of 148° C. (300° F.). The retention time in the dryer for the particles was approximately 30 minutes.

Next, the dry cat food was coated with tallow and acid flavorings. The finished product had a moisture content of approximately 6.0% by weight. The finished product has an Instron local peak force value of approximately 10.27 foot pounds. The shelf life of the dry cat food produced in this example was approximately 18 months. The caloric content (metabolizable energy) of the dry cat food produced in this example was approximately 1768 Kcal/lb.

The chemical analysis of this dry cat food is approximately as follows:

| Ingredient | Amount by Weight |
|---|---|
| Crude Protein | 31.5–34.5% |
| Crude Fat | 11.0–14.5% |
| Crude Fiber | 4.5% |
| Moisture | 12% |
| Linoleic acid | 1.25% |
| Arachidonic acid | 0.02% |
| Calcium | 1.1% |
| Phosphorous | 0.9% |
| Taurine | 0.125% |

Further product was produced at other enzyme levels, including 0.1, and 0.25 percent enzyme by weight of the other ingredients per hour. In each product made in accordance with the present invention, increased palatability of the cat food correlated with added enzyme and decreased condensed meal moisture.

Test animals (cats) were offered dry cat food produced in accordance with the present invention, as well as prior art dry cat food. When enzyme was added at 0.5% by weight of the other ingredients, the observed increase in palatability was the largest. At this enzyme level, 67% of the food consumed was the new cat food, produced in accordance with the present invention, with the remaining 33% consumed being the prior art cat food. In addition, the test animals consumed a total of 50 grams per day of the new cat food, as opposed to 25.4 grams per day of the prior art cat food. The test animals individually preferred the present, new cat food at a ratio of 13 to 1, that is, for every 14 test animals, 1 animal preferred the prior art cat food and 13 animals preferred the new cat food produced in accordance with the present invention.

At an enzyme level of 0.1% by weight of other ingredients, 67.3% of the food consumed was the new cat food, produced in accordance with the present invention, with the remaining 32.7% consumed being the prior art cat food. In addition, the test animals consumed a total of 39.3 grams per day of the new cat food, as opposed to 20.8 grams per day of the prior art cat food. The test animals individually preferred the present, new cat food at a ratio of 14 to 0, that is, for every 14 test animals, none of them exhibited a preference for the prior art cat food over the new cat food produced in accordance with the present invention.

At an enzyme level of 0.25% by weight of other ingredients, 71.2% of the food consumed was the new cat food, produced in accordance with the present invention, with the remaining 28.8% consumed being the prior art cat food. In addition, the test animals consumed a total of 57.1 grams per day of the new cat food, as opposed to 24.4 grams per day of the prior art cat food. The test animals individually preferred the present, new cat food at a ratio of 14 to 2, that is, for every 16 test animals, 2 animals preferred the prior art cat food and 14 animals preferred the new cat food produced in accordance with the present invention.

Example 3
Dry Dog Food Produced in Accordance with the Present Invention

A dry dog food is produced in accordance with the present invention using the following formula:

| Ingredient | Percent by Weight |
| --- | --- |
| Farinaceous components | 60.19 |
| Proteinaceous components | 28.0 |
| Fat | 6.8 |
| Flavorings | 0.01 |
| Vitamins, minerals and essential fatty acids | 5.0 |

The dry farinaceous components, dry proteinaceous components, dry vitamins, minerals and essential fatty acids were fed into a 16-inch preconditioner at a dry meal feed rate of approximately 4506 pounds/hour. Inside the preconditioner, an aqueous solution containing α-amylase was contacted with the dry ingredients. The α-amylase used was Termamyl® 120L, Type S, obtained from Novozymes, Franklinton, N.C. The enzyme is sold with an activity of 120 KNU/g ($2.28 \times 10^3$ SKB units/g), however a 1:10 dilution was performed prior to contacting the enzyme solution with the dry ingredients. The application rate of the enzyme solution was 0.05% of the weight of the dry ingredients.

The preconditioner used in the present example was a 16" diameter wet mixer or preconditioner having a length of approximately 9 feet. Water and/or steam was added in the preconditioner to a condensed meal moisture of approximately 28.4% by weight of the other components. The temperature of the meal in the preconditioner was about 93° C. (200° F.). The meal retention time in the preconditioner was about 5 seconds.

Next, the preconditioned meal moved into an extruder having a diameter of about 7 inches and a length of about 10 feet with a 200 plus horsepower motor. The motor driving the extruder uses 483 volts, 3 phase, AC current and can draw up to about 99 amps. The wet production rate of the extruder was about 5600 pounds per hour. The meal retention time in the extruder was approximately 30 seconds. The inside extruder temperature and the temperature of the extrudate was approximately 100° C. (212° F.). The cooling jacket water temperature was approximately 55.5° C. (132° F.). After passing through a die cap, the extrudate was cut into particles (sometimes called kibbles) with a splitting/cutting knife.

The particles were then transferred to a dryer having a temperature of 148° C. (300° F.). The retention time in the dryer for the particles was approximately 30 minutes.

Next, the dry dog food was coated with tallow and acid flavorings. The finished product had a moisture content of approximately 9.7% by weight. The finished product has an Instron value of approximately 18.81 foot pounds. The shelf life of the dry dog food produced in this example was approximately 18 months. The caloric content (metabolizable energy) of the dry dog food produced in this example was approximately 4.48 Kcal/lb.

The chemical analysis of this dry dog food is approximately as follows:

| Ingredient | Percent by Weight |
| --- | --- |
| Crude Protein | 22.4 |
| Starch | 51.7 |
| Crude Fat | 11 |
| Crude Fiber | 1.57 |
| Moisture | 9.76 |
| Linoleic acid | 1.55 |
| Arachidonic acid | 0.02 |

-continued

| Ingredient | Percent by Weight |
| --- | --- |
| Calcium | 1.11 |
| Phosphorous | 0.89 |
| Taurine | 0.03 |

Test animals (dogs) were offered dry dog food produced in accordance with the present invention, as well as prior art dry dog food. At an enzyme level of 0.05% by weight of other ingredients per hour, 64.9% of the food consumed was the new dog food, produced in accordance with the present invention, with the remaining 35.1% consumed being the prior art dog food. In addition, the test animals consumed a total of 251.6 grams per day of the new dog food, as opposed to 135.4 grams per day of the prior art dog food. The test animals individually preferred the present, new cat food at a ratio of 10 to 2, that is, for every 12 test animals, 2 animals preferred the prior art dog food and 10 animals preferred the new dog food produced in accordance with the present invention.

At an enzyme level of 0.1% by weight of other ingredients per hour, 74% of the food consumed was the new dog food, produced in accordance with the present invention, with the remaining 26% consumed being the prior art dog food. In addition, the test animals consumed a total of 305.1 grams per day of the new dog food, as opposed to 105.1 grams per day of the prior art dog food. The test animals individually preferred the present, new dog food at a ratio of 9 to 1, that is, for every 10 test animals, 1 animal preferred the prior art dog food and 9 animals preferred the new dog food produced in accordance with the present invention.

At an enzyme level of 0.25% by weight of other ingredients per hour, 83.3% of the food consumed was the new dog food, produced in accordance with the present invention, with the remaining 16.7% consumed being the prior art dog food. In addition, the test animals consumed a total of 485.4 grams per day of the new dog food, as opposed to 92.2 grams per day of the prior art dog food. The test animals individually preferred the present, new dog food at a ratio of 14 to 1, that is, for every 15 test animals, 1 animal preferred the prior art dog food and 14 animals preferred the new dog food produced in accordance with the present invention.

Depending its concentration the α-amylase used in the present invention costs about $1.50–$10.00 per ton of finished pet food. This is thought to be more economical than some prior art techniques. The alpha-amylase is only partially inactivated by processing temperatures and maintains an activity of 0.1–57 Novo units/gram (0.0019 to 1.083 SKB units/g) in the finished product.

Thus, there has been shown and described various embodiments of a dry pet food product produced in accordance with the teachings of the present invention. Many changes, modifications, and variations of the present invention will, however, become apparent to those skilled in the art after considering this specification. All such changes, modifications, and variations that do not depart from the spirit and scope of the present invention are deemed to be covered by the invention, which is limited only by the claims that follow.

What is claimed is:

1. A method for producing a dry pet food having increased palatability and a soft texture comprising the following steps:

a) feeding farinaceous and proteinaceous ingredients into a preconditioner;

b) contacting said ingredients with α-amylase and water in the preconditioner;

c) extruding said ingredients from an extruder and forming an extrudate into particles; and d) drying the particles to inactivate a portion, but not all of the α-amylase resulting in a finished product having a moisture content from about 5% to 12% by weight and an Instron local peak force value from about 9.5 to about 7.5 foot pounds.

2. A method for producing a dry pet food having increased palatability and a soft texture comprising the following steps:

a) feeding farinaceous and proteinaceous ingredients into a preconditioner;

b) contacting said ingredients with α-amylase and water in the preconditioner;

c) extruding said ingredients from an extruder and forming an extrudate into particles; and d) drying the particles to inactivate a portion, but not all of the α-amylase resulting in a finished product having a moisture content from about 5% to 8% by weight and an Instron local peak force value from about 9.5 to about 16.5 foot pounds.

3. The method of claim 2 wherein the moisture content of the pet food leaving the extruder of step c is in the range of from about 18% to about 23%, by weight.

4. A method for producing a dry pet food having increased palatability and a soft texture comprising the following steps:

a) feeding farinaceous and proteinaceous ingredients into a preconditioner;

b) contacting said ingredients with α-amylase and water in the preconditioner;

c) extruding said ingredients from an extruder and forming an extrudate into particles having a moisture content of from about 18 to less than about 23% by weight; and d) drying the particles to inactivate a portion, but not all of the α-amylase resulting in a finished product having a moisture content from about 5% to 8% by weight and an Instron local peak force value from about 9.5 to about 17.5 pounds per foot.

5. A method for producing a dry pet food having increased palatability and a soft texture comprising the following steps:

a) feeding farinaceous and proteinaceous ingredients into a preconditioner;

b) contacting said ingredients with α-amylase and water in the preconditioner, said α-amylase being added at a rate of about 0.05% to about 0.5% by weight of the ingredients;

c) extruding said ingredients from an extruder and forming an extrudate into particles having a moisture content of from about 18 to less than about 23% by weight; and d) drying the particles to inactivate a portion, but not all of the α-amylase resulting in a finished product having a moisture content from about 5% to about 8% by weight and an Instron local peak force value from about 9.5 to about 17.5 pounds per foot.

6. A method for producing a dry pet food having increased palatability and a soft texture comprising the following steps:

a) feeding farinaceous and proteinaceous ingredients into a preconditioner;

b) contacting said ingredients with α-amylase and water in the preconditioner;

c) extruding said ingredients from an extruder and forming an extrudate into particles; and d) drying the particles to inactivate a portion, but not all of the α-amylase resulting in a finished product having a moisture content from about 9% to 12% by weight and an Instron local peak force value from about 17 to about 18 foot pounds.

7. The method of claim 6 wherein the moisture content of the pet food leaving the extruder of step c is in the range of from about 18% to about 23%, by weight.

8. A method for producing a dry pet food having increased palatability and a soft texture comprising the following steps:

a) feeding farinaceous and proteinaceous ingredients into a preconditioner;

b) contacting said ingredients with α-amylase and water in the preconditioner;

c) extruding said ingredients from an extruder and forming an extrudate into particles having a moisture content of from about 25% to less than about 28% by weight; and d) drying the particles to inactivate a portion, but not all of the α-amylase resulting in a finished product having a moisture content from about 9% to 12% by weight and an Instron local peak force value from about 17 to about 18 foot pounds.

9. A method for producing a dry pet food having increased palatability and a soft texture comprising the following steps:

a) feeding farinaceous and proteinaceous ingredients into a preconditioner;

b) contacting said ingredients with α-amylase and water in the preconditioner, said α-amylase being added at a rate of about 0.05% to about 0.5% by weight of the ingredients;

c) extruding said ingredients from an extruder and forming an extrudate into particles having a moisture content of from about 25% to less than about 28% by weight; and d) drying the particles to inactivate a portion, but not all of the α-amylase resulting in a finished product having a moisture content from about 9% to about 12% by weight and an Instron local peak force value from about 17 to about 18 foot pounds.

* * * * *